(12) United States Patent
Hewitt, Jr.

(10) Patent No.: US 11,980,325 B2
(45) Date of Patent: May 14, 2024

(54) HOOKED TOWEL ROD AND METHOD

(71) Applicant: Melvin Sinclair Hewitt, Jr., Joliet, IL (US)

(72) Inventor: Melvin Sinclair Hewitt, Jr., Joliet, IL (US)

(*) Notice: Subject to any disclaimer, the term of this patent is extended or adjusted under 35 U.S.C. 154(b) by 0 days.

(21) Appl. No.: 16/033,367

(22) Filed: Jul. 12, 2018

(65) Prior Publication Data
US 2019/0387931 A1   Dec. 26, 2019

Related U.S. Application Data

(60) Provisional application No. 62/533,033, filed on Jul. 15, 2017.

(51) Int. Cl.
*A47K 10/10* (2006.01)
*A47K 10/04* (2006.01)

(52) U.S. Cl.
CPC .............. *A47K 10/10* (2013.01); *A47K 10/04* (2013.01)

(58) Field of Classification Search
CPC ........ A47K 10/10; A47K 10/08; A47K 10/04; A47G 25/746
USPC ............................................ 211/88.04, 123
See application file for complete search history.

(56) References Cited

U.S. PATENT DOCUMENTS

| | | | | |
|---|---|---|---|---|
| 158,476 A | * | 1/1875 | Dorr | A47G 25/746 211/85.3 |
| 586,080 A | * | 7/1897 | Thompson | A47K 10/04 211/123 |
| 1,096,282 A | * | 5/1914 | Boehm | A47B 61/003 248/251 |
| 1,097,496 A | * | 5/1914 | Woodhead | A47K 10/10 248/231.91 |
| 1,409,056 A | * | 3/1922 | Michaels | A47K 10/04 211/123 |
| 1,457,166 A | * | 5/1923 | Hayes | A47K 10/14 211/88.04 |
| 1,480,065 A | * | 1/1924 | Hart | A47G 25/0657 211/89.01 |
| 1,510,294 A | * | 9/1924 | Bertrand | A47G 25/06 248/218.1 |
| 1,532,320 A | * | 4/1925 | Knapp | B60N 3/02 296/77 |
| 1,554,375 A | * | 9/1925 | Schnell | B60N 3/02 211/123 |
| 1,692,059 A | * | 11/1928 | Starner | A47K 10/10 211/123 |
| 1,697,763 A | * | 1/1929 | Hall | B60R 7/08 211/123 |
| 1,799,558 A | * | 4/1931 | Howard | F24D 19/00 248/213.4 |

(Continued)

FOREIGN PATENT DOCUMENTS

| | | | | |
|---|---|---|---|---|
| CH | 382399 A | * | 9/1964 | ............. A47K 10/10 |
| DE | 442569 C | * | 3/1927 | ............. A47K 10/10 |

(Continued)

*Primary Examiner* — Stanton L Krycinski
(74) *Attorney, Agent, or Firm* — Sagacity Legal, PLLC

(57) ABSTRACT

A towel rod is provided having an elongated rigid body having two shorter parallel rods positioned lower than the body by support means on each end of the body. The body having support means attached to each end of the body and attach to and provide a gap to a wall.

14 Claims, 4 Drawing Sheets

(56) References Cited

U.S. PATENT DOCUMENTS

| | | | | |
|---|---|---|---|---|
| 1,909,334 A * | 5/1933 | Brewer | A47G 25/06 | 211/123 |
| 1,972,282 A * | 9/1934 | Wittstein | A47K 10/10 | 211/123 |
| 2,290,468 A * | 7/1942 | Godfrey | A47K 10/04 | 211/123 |
| 2,447,204 A * | 8/1948 | Piotrowski | A47G 25/06 | 211/85.3 |
| 2,512,203 A * | 6/1950 | Fluharty | A47K 10/10 | 211/123 |
| 2,612,273 A * | 9/1952 | Donald | A47K 10/04 | 211/119.009 |
| 2,622,743 A * | 12/1952 | Ross | A47F 5/0876 | 211/123 |
| 2,639,041 A * | 5/1953 | Davis | A47H 1/02 | 211/123 |
| 2,790,197 A * | 4/1957 | Ganter | A47H 13/02 | 16/94 D |
| 2,825,469 A * | 3/1958 | Watkins | D06F 57/12 | 211/105.3 |
| 4,465,198 A * | 8/1984 | Martin | A47K 10/04 | 211/105.3 |
| 4,828,122 A * | 5/1989 | Day | A47H 1/102 | 211/105.1 |
| 5,711,434 A * | 1/1998 | Adams | A47K 10/04 | 108/42 |
| 6,012,692 A * | 1/2000 | Meck | A47K 10/10 | 248/222.14 |
| 6,220,460 B1 * | 4/2001 | Pan | A47K 10/10 | 211/105.1 |
| 6,371,423 B1 * | 4/2002 | Miller | A47H 1/102 | 211/123 |
| 6,651,830 B2 * | 11/2003 | Pan | A47K 10/10 | 211/105.1 |
| 6,719,156 B2 * | 4/2004 | Ellbogen | A47H 1/10 | 211/105.1 |
| 6,796,442 B1 * | 9/2004 | Wu | A47K 10/04 | 211/105.1 |
| 8,479,931 B1 * | 7/2013 | Richards | A47H 1/022 | 211/105.2 |
| 8,671,545 B1 * | 3/2014 | Zimmerman | F16M 13/02 | 211/123 |
| 9,033,296 B1 * | 5/2015 | Richards | A47H 1/022 | 248/263 |
| 9,220,340 B2 * | 12/2015 | Kuo | A47B 47/0058 | |
| 9,480,206 B2 * | 11/2016 | Hendricks | A01G 5/04 | |
| 9,888,767 B1 * | 2/2018 | Gao | A47K 10/04 | |
| 2009/0188879 A1 * | 7/2009 | Shieh | A47K 10/10 | 211/88.04 |
| 2009/0308995 A1 * | 12/2009 | Kuo | A47K 10/10 | 248/231.91 |
| 2010/0300994 A1 * | 12/2010 | Turner-Wiltshire | A47K 10/10 | 211/16 |
| 2012/0024809 A1 * | 2/2012 | Rowan | A47H 1/102 | 211/124 |
| 2013/0092646 A1 * | 4/2013 | Wang | A47H 1/022 | 211/123 |

FOREIGN PATENT DOCUMENTS

| | | | | |
|---|---|---|---|---|
| DE | 566177 C | * | 12/1932 | A47K 10/10 |
| FR | 2623575 A1 | * | 5/1989 | A47K 10/10 |
| GB | 263690 A | * | 1/1927 | A47K 10/10 |
| GB | 657177 A | * | 9/1951 | A47K 10/10 |
| GB | 743595 A | * | 1/1956 | A47K 10/10 |
| KR | 200461401 Y1 | * | 7/2012 | |

* cited by examiner

FRONT VIEW

TOP VIEW

ISOMETRIC VIEW

FRONT VIEW

FRONT VIEW

HOOKED TOWEL ROD AND METHOD

The present application claims the benefit of U.S. provisional patent application Ser. No. 62/533,033, entitled "Hooked Towel Rod" filed Jul. 15, 2017, which is hereby incorporated by reference.

FIELD OF THE INVENTION

The present invention relates to a household article. More particularly, and in a preferred intended use, the present invention relates to a rack for supporting towels and a towel hanging method for facilitating the drying of towels.

BACKGROUND OF ART

Most people take a shower or bath once every 24 hours. The common practice is to use a dry towel to thoroughly dry the body after bathing. Once a towel is used there is need to dry it thoroughly and store it for the next use. There are a wide variety of towel hanging, organization and storage devise such as towel rods, hooks, racks, baskets, shelves, heated towel drying devices or devices that are comprised of a combination of the afore mentioned devices. The problem with these products is that they either take up too much space in a shared bathroom, do not allow for efficient towel drying, are relatively expensive or waste energy. One of the more common prior art devices used is a variety of basic towel rods. After use a towel is usually folding in half by width and then folded at mid-length over a towel rod however this common method traps moisture and does not allow a towel to dry thoroughly. One solution to this problem is to only fold the towel once in half over a towel rod or shower curtain rod. This method allows the towel to dry faster but does not allow room for a washcloth to be hung and is an inconvenience for anyone else who needs to bath.

Towel racks with multiple hooks and bars help to save space but a towel hung on a hook or folded over a towel rod will not dry thoroughly by the next use. Towel drying racks are another sought after solution but most require a system such as a boiler and radiator system or electrical device already in place. This is not a viable option for most households. Towels that are not dried efficiently and left damp in the bathroom can facilitate microorganism growth some of which may produce a foul odor and may become a health risk.

The present inventor recognized the need for a device that aids in efficiently drying towels, uses less living space and does not require energy use as prior art devices do. The inventor recognized the need for an improved method of hanging a towel in a state that better facilitates water evaporation.

SUMMARY OF INVENTION

A towel rod is disclosed. In one embodiment, the towel rod comprises a rigid elongated rod or pole. The first portion is relatively long in length compared to the other portions of the first embodiment. A second and third portion bend downward and then outward from the first portion at either end of the horizontally oriented first portion and support a fourth and fifth portion that continue outward from the second and third portions to form relatively strait hooks or rods shorter in length than the first portion. The fourth and fifth portions are supported under the first portion by the second and third portions. A second and third embodiment comprises of rigid support means for the first embodiment and are located on either end and on the same side of the first portion of the first embodiment. The second and third embodiments are affixed to a stationary surface or structure such as but not limited to a bathroom wall. The hook portions or strait rods comprising the third and fourth portions of the first embodiment provide support for the outer portion of a towel by allowing the long edges of a towel to be folded over them. The first embodiment may be one continuous rod comprising a plurality of bends or a plurality of contiguous embodiments. The present towel hanging method places a towel on the present invention in a state that exposes more surface area of a towel and facilitates more efficient water evaporation from a towel's surfaces than the states that can be achieved using common towel hanging methods with prior art devices.

DETAILED DESCRIPTION OF DRAWINGS

In the following description the same numeral references refer to similar elements. The embodiments shown in the Figures are preferred, for exemplification of purpose only. In addition, although the preferred embodiments of the present invention as illustrated in the accompanying drawings comprise various components, etc. and although the preferred embodiments of the towel rod device and corresponding parts of the present invention as shown consist of certain geometrical configurations as explained and illustrated herein, not all of these components and geometries are essential to the invention and thus should not be taken in their restrictive sense, i.e. These components and geometries should not be taken as to limit the scope of the present invention. It is to be understood, as also apparent to a person skilled in the art, that other suitable components and cooperation there between, as well as other suitable geometrical configurations may be used for the towel rod device according to the present invention, as will be briefly explained herein and as can be easily inferred here from by a person skilled in the art, without departing from the scope of the invention.

Figure 1:
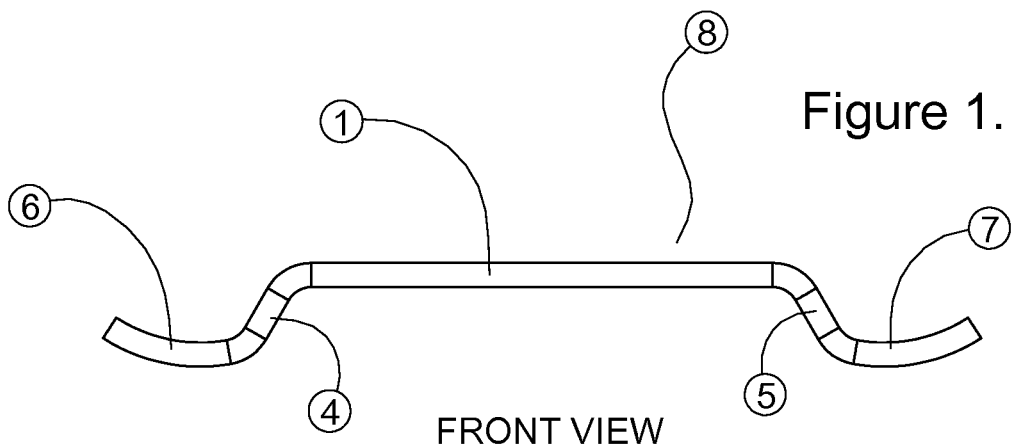
FIG. 1. shows a front view of the present invention.
Figure 9:
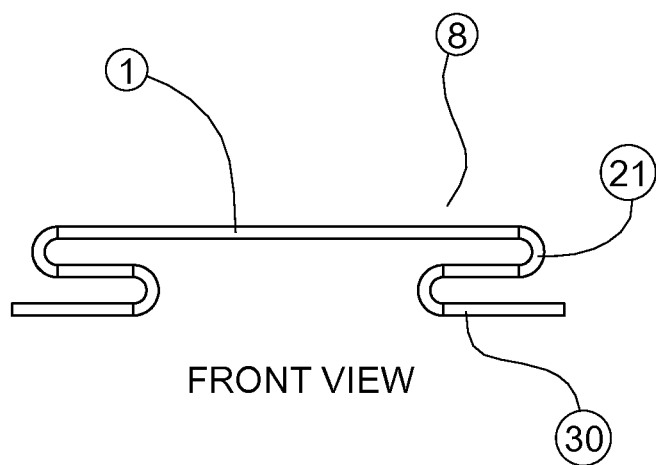
FIG. 9. shows the present invention, towel rod in an alterative configuration FIG. 10. shows the present invention, towel rod in an alternative configuration.
Figure 10:
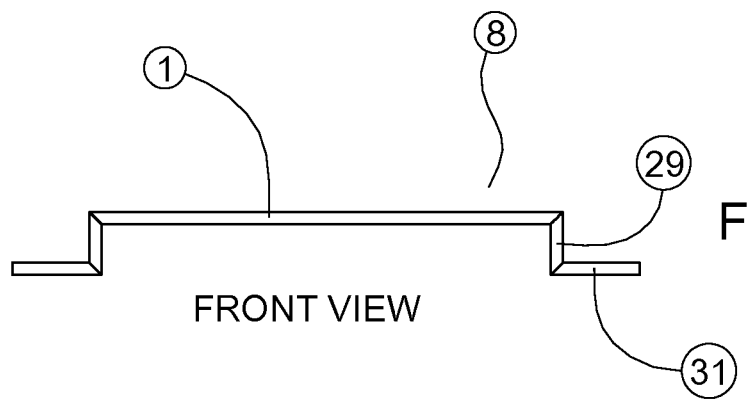

Referring to the present drawings there is shown in FIG. 1 of the present invention which is a towel rack device 8 constructed of a horizontally orientated bar as the major portion 1 of the first embodiment of FIG. 1 which at present has a circular cross section but may be constructed of any variety of shapes with a cross section such as but not limited to a square, triangle, hexagon, etc. The second portion 4 and third portion 5 of the first embodiment are of no fixed pattern and are attached to or extensions of the first portion 1 of the first embodiment and are located on either end of the first portion 1 of the first embodiment. At present the second portion 4 and third portion 5 of the first embodiment bend downward relative to the first portion 1 of the first embodiment. The second portion 4 and third portion 5 of the first embodiment then bend out from the first portion 1 of the first embodiment and are attached thereon or are extended by a fourth portion 6 and fifth portion 7 of the first embodiment which are support means for a woven piece of fabric such as but not limited to a towel 10 of standard size as is known in the art and of which is present in FIGS. 4 through 7. The second portion 4 and third portion 5 of the first embodiment may be created of a variety of shapes within the scope of facilitating the present towel hanging method. An example of such as is shown in FIG. 9 and FIG. 10. The fourth portion 6 and fifth portion 7 of the first embodiment may be created of a variety of shapes within the scope of facilitating the present towel hanging method. An example of such as is shown in FIG. 9 and FIG. 10.

Figure 8:
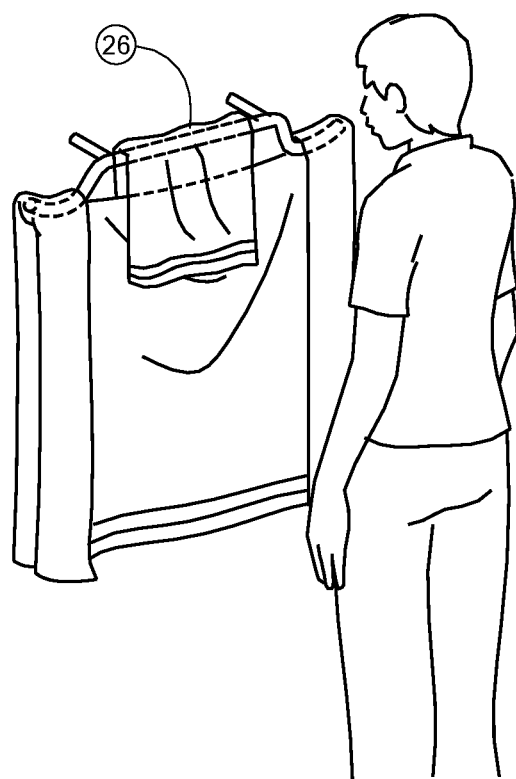
FIG. 8. shows the present invention, towel rod in the second state of use.

The first portion 1 of the first embodiment may be able to hang a smaller piece of woven fabric such as but not limited to a washcloth 26 as known in the art and as shown in FIG. 8.

Figure 2:
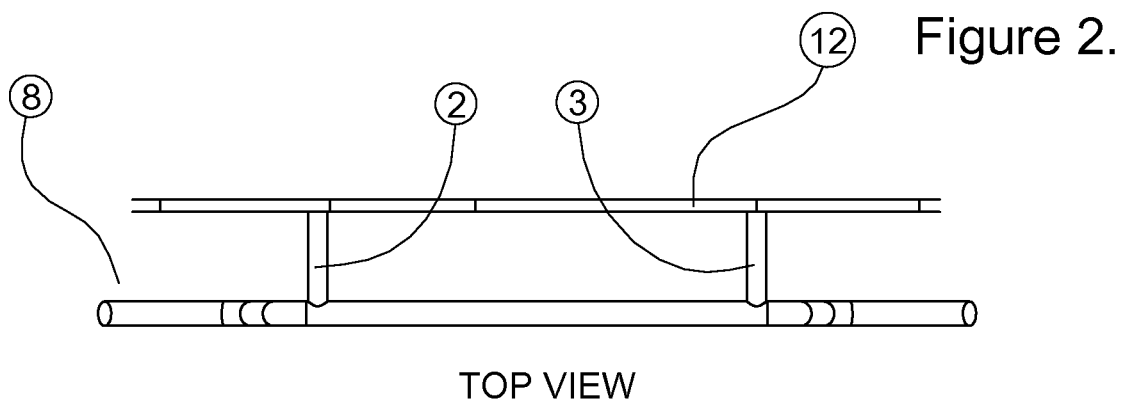
FIG. 2. shows a top view of the present invention of FIG. 1.
Figure 3:
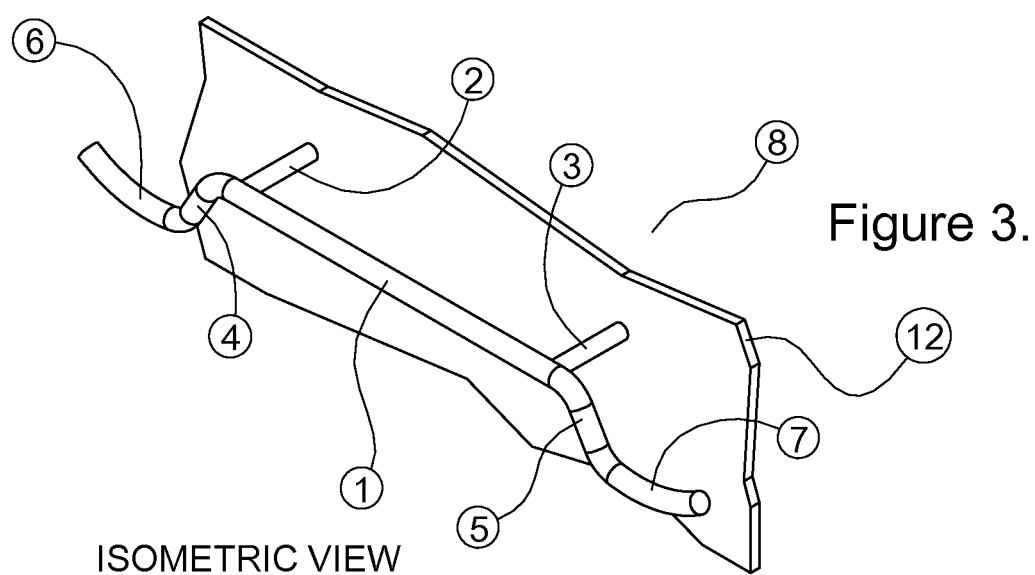
FIG. 3. shows an isometric view of the present invention of FIG. 1, in accordance with all the embodiments of the present invention.

Spacer constructs 2, 3 of no fixed shape or pattern and of shorter length in FIG. 2 relative to the first portion 1 of the first embodiment are attached thereon near either end of the first portion 1 of the first embodiment for the purpose of mounting onto a stationary object such as but not limited to a wall, door, and the like, and provide adequate separation between the hanging towel 10 and wall 12.

Figure 4:
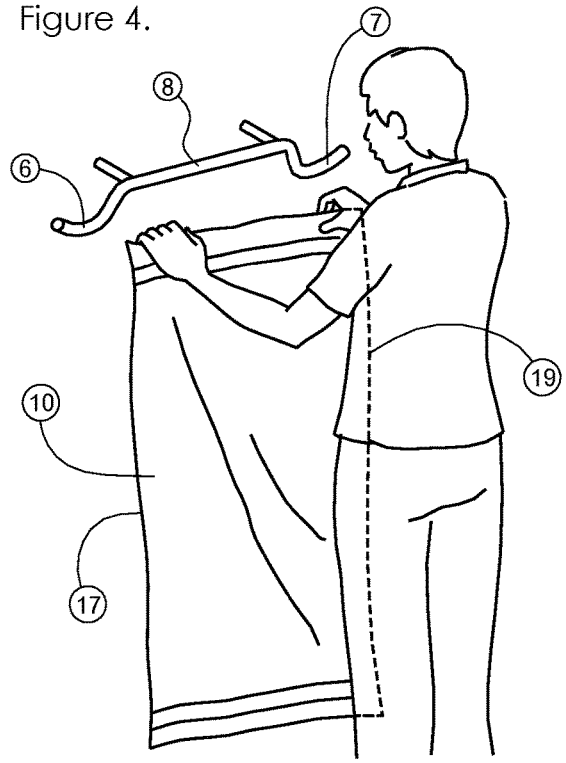
FIG. 4. shows the first step of the towel hanging method.
Figure 5:
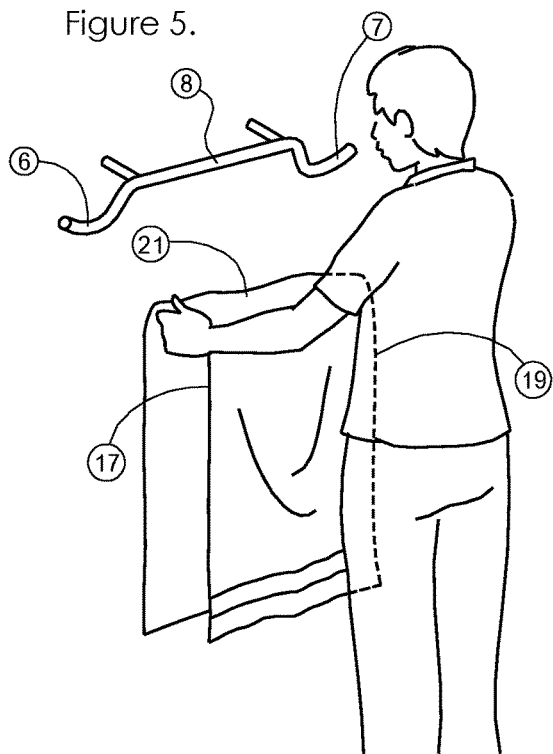
FIG. 5. shows the second step of the towel hanging method.
Figure 6:
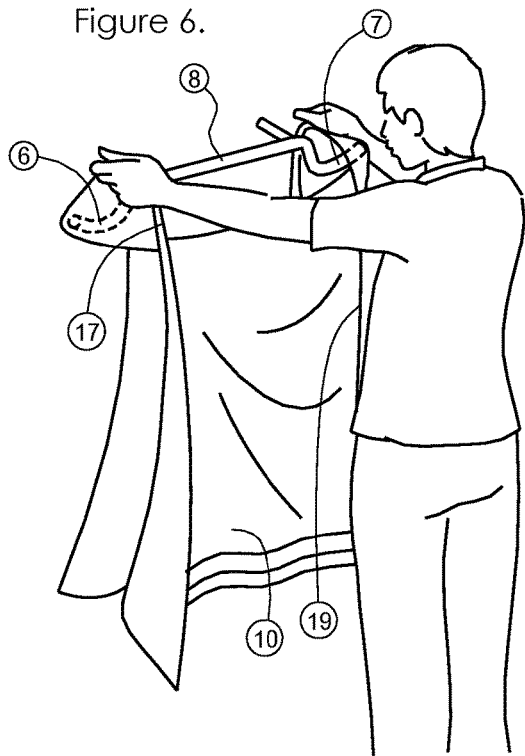
FIG. 6. shows the third step of the towel hanging method.
Figure 7:
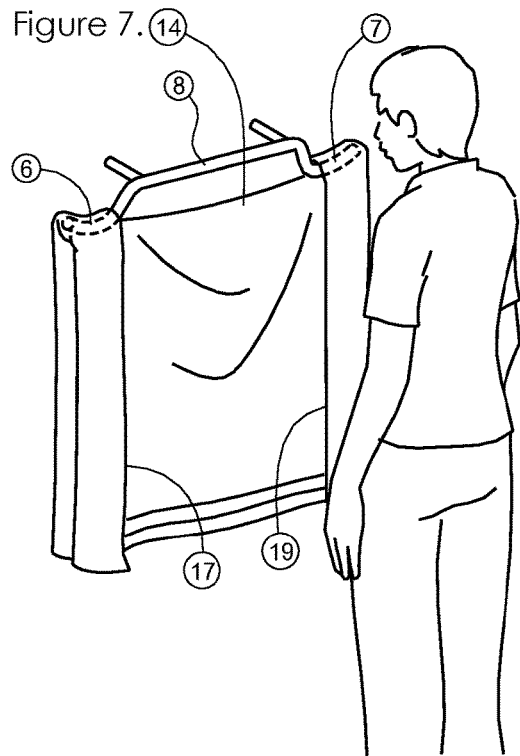
FIG. 7. shows the present invention, towel rod in the first state of use.

FIGS. 4 through 8 show the steps of the present towel hanging method and states of use of the present invention. FIG. 4. shows the first step of the towel hanging method which is to prepare a towel 10 to be folded by holding a towel vertically by length. FIG. 5. shows the second step of the towel hanging method which is to fold a towel 10 approximately in half at middle length 21. FIG. 6. shows the third step of the towel hanging method which is to fold the right length edge 17 and left length edge 19 of a towel 10 over the fourth portion 6 and fifth portion 7 of the first embodiment of the present invention 8 so that a towel 10 is supported thereon by portions 6 and 7 of the first embodiment. The portions of a towel 10 near the respective right length edge-17 and left length edge 19 may be single folded in the case of small towels or double folded in the case of larger towels over the portions 6 and 7 of the first embodiment of the hooked towel rod 8. FIG. 7 shows the present invention 8 in the first state of use with a towel 10 in it's final position supported by the present invention 8. FIG. 8. shows the present invention in its second state of use with a washcloth 26 supported by the present invention. FIG. 9. shows an alternate configuration of the hooked embodiment 21 which supports the support means 30 for a towel. FIG. 10. shows an alternate configuration of the hooked embodiment 29 which supports the support means 31 for a towel.

INDUSTRIAL APPLICABILITY

The present invention could be created in a variety of colors to increase its aesthetic appeal to consumers and manufactured using a variety of materials such as but not limited to metals such but not limited to steel, aluminum or other metal alloys. Or other materials such as but not limited to wood, plastics or a combination of materials such as rigid composite materials.

Any metal components of the present invention 8 can be manufactured with the use of a variety of metal forming techniques including but not limited to metal casting techniques, metal extrusions techniques, metal welding techniques, metal bending techniques and metal milling techniques, etc.

Any plastic components of the present invention 8 can be manufactured with the use of a variety of plastic forming techniques such as but not limited to injection molding, 3D printing and extrusion molding techniques, etc. Any wood components of the present invention 8 can be manufactured with the use of a variety of wood forming techniques such as but not limited to wood milling, wood forming, wood carving techniques and the like.

The present invention may be created by forming a rod of afore mention rigid metal material and using known bending techniques bend a long cylindrical rod on each end downward and then out from the major body 1 to form hooks or strait lengths 6 and 7 on either end of the major body 1. The total length of the present invention including portions 1, 4, 5, 6, and 7, of the first embodiment must be sufficient to secure a towel 10 from falling under its own weight using the present towel hanging method or when disturbed by forces such but not limited to one stroking a towel 10 to make folds neat or adjusting a towel 10 into the final present towel hanging position. The wall spacers and mounts 2, 3 may be created by forming the afore mentioned materials into a variety of shapes such as tubes, solid cylinders or rods of any shaped cross section or other form which provides support for the hooked towel rod 8 to be attached on to a wall 12 or other stationary object such as a door or the like. At present the spacer mounts 2, 3 may be made of tubes which can be fastened onto the towel rod by welds, with screws and threaded holes or other means known in the art. The spacer mounts 2, 3 may be attached to a wall 12 or other stationary object or fastening device by weld means, with screws and threaded holes or other means known in the art.

The above description is intended to enable the person skilled in the art to practice the invention. It is not intended to detail all of the possible carnations and modifications that become apparent to the skilled worker upon reading this description. It is interceded however that all such modifications and variations be included within the scope of the invention and that is defined by the following claims.

The invention claimed is:

1. A towel rod, comprising:
a rigid first embodiment, a rigid second embodiment, and a rigid third embodiment; the rigid first embodiment comprises an elongated first portion centrally located relative to adjacent portions of the rigid first embodiment and oriented horizontally and parallel to a floor; a second portion of the rigid first embodiment is located on a left end of the rigid first embodiment and is oriented or at an angle to the first portion and extends downward to support a fourth portion of the rigid first embodiment; a third portion of the rigid first embodiment is located on a right end of the rigid first embodiment and is oriented or at an angle to the first portion and extends downward to support a fifth portion of the rigid first embodiment; an empty space devoid of any structures is in part defined therebetween by the elongated first portion, the second portion, and the third portion; the rigid first embodiment is supported by the rigid second embodiment and the rigid third embodiment which are oriented perpendicularly to the rigid first embodiment and are attached to the rigid first embodiment near each end of the first portion of the rigid first embodiment and provide one or more spacer mounts to attach onto a stationary object and provide a gap between the stationary object and the rigid first embodiment, wherein the fourth portion and the fifth portion are directed oppositely to face away from each other and are each curved upwards to form in a direction opposite from the floor, wherein the first portion, the second portion, the third portion, the fourth portion, and the fifth portion, are integrally and continuously formed from a single cylindrical rod.

2. The towel rod of claim 1, wherein the length of the first portion is at least 6 inches and no more than 26 inches.

3. The towel rod of claim 1, wherein the length of the fourth portion of the rigid first embodiment is at least 2 inches and no more than 10 inches.

4. The towel rod of claim 1, wherein the length of the fourth portion of the rigid first embodiment is at least ½ inches and no more than 6 inches lower than the first portion of the rigid first embodiment.

5. The towel rod of claim 1, wherein the length of the fifth portion of the rigid first embodiment is at least 2 inches and no more than 10 inches.

6. The towel rod of claim 1, wherein the rigid third embodiment and the rigid second embodiment provide at least 2 inches and no more than 16 inches of a gap between the rigid first embodiment and the stationary object.

7. The towel rod of claim 1, wherein the towel rod provides for a towel and a wash cloth to be stored together, with an intermediate portion of the towel extending across the empty space without contact with the towel rod.

8. The towel rod of claim 1, wherein the towel rod provides for a towel and a wash cloth to be stored significantly apart from one and the other to allow air flow between the corresponding surfaces of the towel and the wash cloth.

9. The towel rod of claim 1, wherein the towel rod provides for a reduction in motions or steps needed to hang and support a towel symmetrically in a hyperbolic paraboloid state on the towel rod, prevents surfaces of the towel to rest on itself, and maintains minimal contact of the towel and the towel rod to provide air flow between corresponding surfaces of the towel and the towel rod.

10. The towel rod of claim 1, wherein the towel rod is made from a rigid material selected from a group consisting of: aluminum, aluminum alloy, steel, steel alloy, bronze, bronze alloy, copper, coper alloy, zinc, zinc alloy, wood, wood composite, plastic, glass, and carbon fiber.

11. A towel rod, comprising:
   an elongated first portion positionable at an elevation to a floor and defining a first end and a second end, the second end being opposed to the first end;
   a second portion and a third portion, the second portion extending from the first end and the third portion extending from the second end, each of the second portion and the third portion being oriented at an angle to the elongated first portion, an empty space devoid of any structures is in part defined therebetween by the elongated first portion, the second portion, and the third portion;
   a fourth portion and a fifth portion, the fourth portion extending from the second portion and the fifth portion extending from the third portion, wherein
      the fourth portion and the fifth portion are directed oppositely to face away from each other and are each curved upwards to form in a direction opposite from the floor, wherein the first portion, the second portion, the third portion, the fourth portion, and the fifth portion, are integrally and continuously formed from a single cylindrical rod.

12. The towel rod of claim 11, wherein each of the elongated first portion, the fourth portion, and the fifth portion, are disposed to extend along a common plane.

13. The towel rod of claim 11 further including one or more spacer mounts to attach onto a stationary object and provide a gap between the stationary object and the elongated first portion.

14. The towel rod of claim 11, wherein a distance between the elongated first portion and the fourth portion is equal to a distance between the elongated first portion and the fifth portion.

* * * * *